(12) United States Patent
Saito et al.

(10) Patent No.: US 11,362,791 B2
(45) Date of Patent: Jun. 14, 2022

(54) TERMINAL AND A BASE STATION FOR MAPPING OR RECEIVING A DEMODULATION REFERENCE SIGNAL

(71) Applicant: NTT DOCOMO, INC., Tokyo (JP)

(72) Inventors: Keisuke Saito, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/622,681

(22) PCT Filed: Jun. 15, 2017

(86) PCT No.: PCT/JP2017/022229
§ 371 (c)(1),
(2) Date: Dec. 13, 2019

(87) PCT Pub. No.: WO2018/229958
PCT Pub. Date: Dec. 20, 2018

(65) Prior Publication Data
US 2021/0143961 A1 May 13, 2021

(51) Int. Cl.
*H04L 27/26* (2006.01)
*H04L 5/00* (2006.01)

(52) U.S. Cl.
CPC ........ *H04L 5/0051* (2013.01); *H04L 27/2602* (2013.01)

(58) Field of Classification Search
CPC . H04L 1/0003; H04L 1/0009; H04L 25/0224; H04L 5/0051; H04L 1/08; H04W 4/70

(Continued)

(56) References Cited

U.S. PATENT DOCUMENTS

2014/0098780 A1 4/2014 Kim et al.
2015/0334762 A1* 11/2015 Yang ............... H04W 76/15
370/329

(Continued)

FOREIGN PATENT DOCUMENTS

KR  10-2016-0055095 A   5/2016
WO     2016/161619 A1  10/2016

OTHER PUBLICATIONS

Nokia et al.: "DL DMRS patterns link performance evaluation", 3GPP Draft; R1-1701104, 3rd Generation Partnership (3GPP), Mobile Competence Centre; Jan. 2017 (Year: 2017).*

(Continued)

*Primary Examiner* — Melvin C Marcelo
*Assistant Examiner* — Natali Pascual Peguero
(74) *Attorney, Agent, or Firm* — Osha Bergman Watanabe & Burton LLP

(57) ABSTRACT

Provided is a user terminal which is used in a future wireless communication system which bundles a plurality of slots (sub-frames) in the time direction. When applying bundling, in the leading slot, Additional DMRS (Demodulation Reference Signal) is mapped according to channel quality (factors which lead to a deterioration in quality, such as Doppler shift, propagation environment, etc.), and in second and subsequent slots, the existence of Additional DMRS mapping or the mapping position is selected on the basis of rules concerning Additional DMRS mapping. The control unit (203) of the user terminal (20) specifies, in second and subsequent slots, the existence of Additional DMRS mapping and the mapping position on the basis of the aforementioned rules.

6 Claims, 11 Drawing Sheets

(58) Field of Classification Search
USPC .................................................. 370/329–331
See application file for complete search history.

(56) References Cited

U.S. PATENT DOCUMENTS

2018/0069652 A1* 3/2018 Yamamoto ............ H04L 1/0009
2018/0278395 A1* 9/2018 Yoon ..................... H04L 5/0007

OTHER PUBLICATIONS

ETSI TR 138 912 ("5G; Study on New Radio (NR) access technology (3GPP TR 38.912 version 14.0.0 Release 14)", V14.0.0 (May 2017) (Year: 2017).*

"Evolved Universal Terrestrial Radio Access (E-UTRA) and Evolved Universal Terrestrial Radio Access Network (E-UTRAN); Overall description; Stage 2 (Release 13)," Jun. 2016, 3GPP TS 36.300 v13.4.0 (310 pages).

Qualcomm, Ericsson, Panasonic, NTT Docomo, ZTE, Convida, Nokia, ASB, Sony, Intel, "Way Forward On Frame Structure," May 23-27, 2016, R1-165575 (2 pages).

Huawei, HISilicon, "Design of DL DMRS for data transmission," May 15-19, 2017, 3GPP TSG-RAN WG1 #89 R1-1706933, Hangzhou, China (6 pages).

International Search Report issued in corresponding International Application No. PCT/JP2017/022229, dated Aug. 15, 2017, with translation (6 pages).

Written Opinion issued in corresponding International Application No. PCT/JP2017/022229, dated Aug. 15, 2017 (3 pages).

Extended European Search Report issued in Application No. 17914035.5, dated Dec. 11, 2020 (8 pages).

3GPP TSG RAN WG1 Meeting #89; R1-1708596; "Discussion on DL DMRS design;" Qualcomm Incorporated; May 15-19, 2017; Hangzhou, China (14 pages).

3GPP TSG RAN WG1 NR Ad-Hoc Meeting; R1-1701104; "DL DMRS patterns link performance evaluation;" Nokia, Alcatel-Lucent Shanghai Bell; Jan. 16-20, 2017; Spokane, USA (11 pages).

Office Action issued in Japanese Application No. 2019-524681; dated Sep. 14, 2021 (8 pages).

Office Action issued in Canadian Application No. 3067322; dated Jul. 14, 2021 (3 pages).

Office Action issued in Chinese Application No. 201780091863.6 dated Dec. 29, 2021 (14 pages).

Office Action issued in Japanese Application No. 2019-524681; dated Apr. 5, 2022 (9 pages).

\* cited by examiner

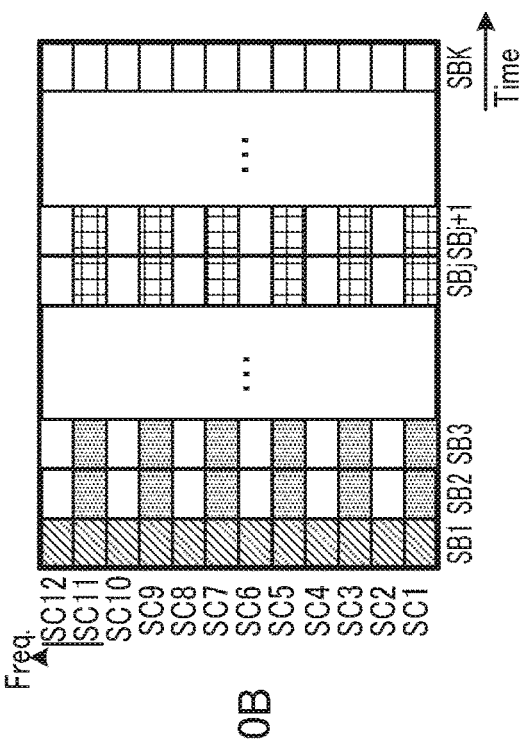
FIG. 10A
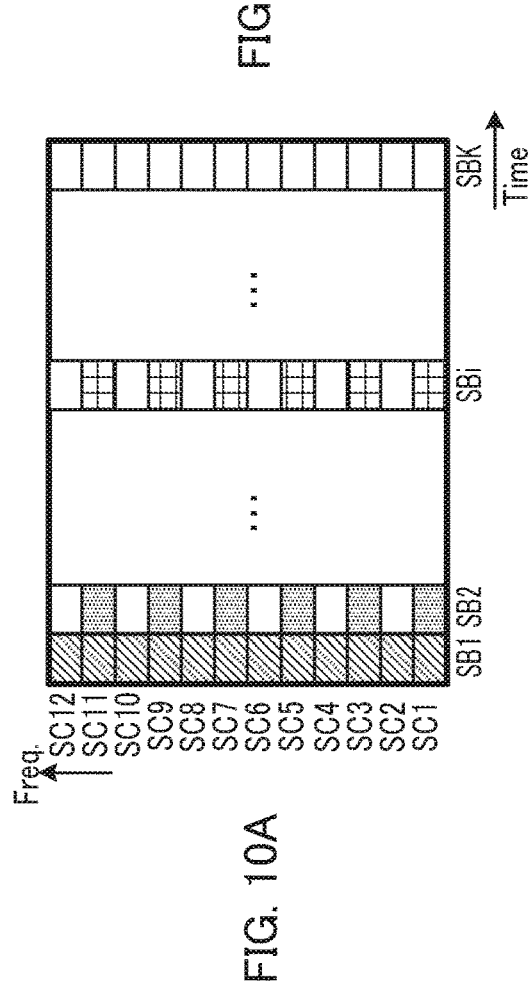
FIG. 10C
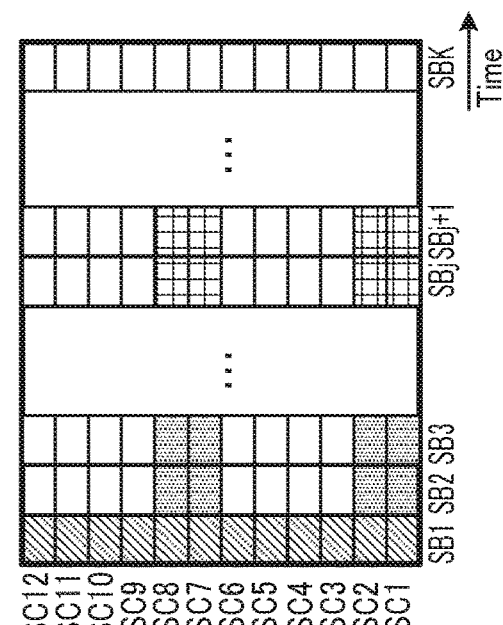
FIG. 10B
FIG. 10D

TERMINAL AND A BASE STATION FOR MAPPING OR RECEIVING A DEMODULATION REFERENCE SIGNAL

TECHNICAL FIELD

The present invention relates to a user terminal and a radio communication method in a next-generation mobile communication system.

BACKGROUND ART

Long Term Evolution (LTE) has been specified for achieving a higher data rate, lower latency, and the like in a Universal Mobile Telecommunications System (UMTS) network (see Non-Patent Literature (hereinafter referred to as "NPL") 1). Successor systems of LTE (which are referred to as, for example, LTE-Advanced (LTE-A), Future Radio Access (FRA), 5th generation mobile communication system (5G), 5G plus (5G+), and New Radio Access Technology (New-RAT)), have also been studied for achieving a broader bandwidth and a higher speed based on LTE.

For future radio communication systems, to shorten the processing time required for channel estimation and signal demodulation in sub-frames, a technique for mapping a reference signal for demodulation (for example, a demodulation reference signal (DMRS)) to a position ahead of a sub-frame (front-loaded DMRS) is under study (NPL 2).

For future radio communication systems, to support high-speed movement, a technique for mapping an additional DMRS to a predetermined symbol in a sub-frame so that doppler fluctuations can be corrected at the receiver is also under study.

For future radio communication systems, a technique for bundling multiple slots (sub-frames) along the time direction (time direction bundling) is also under study. Collective channel estimation for multiple slots bundled along the time direction provides effects of an enhancement of the accuracy of channel estimation, an enhancement of doppler resistance, and the like.

CITATION LIST

Non-Patent Literature

NPL 1

3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016

NPL 2

R1-165575, Qualcomm, Ericsson, Panasonic, NTT Docomo, ZTE, Convida, Nokia, ASB, Sony, Intel, "Way Forward On Frame Structure," May 2016

SUMMARY OF INVENTION

Technical Problem

For time direction bundling, additional DMRS mapping rules in the second or later slots have never been under study so far.

One object of one aspect of the present invention is to provide a user terminal and a radio communication method in which, in the case where time direction bundling is applied, additional DMRS mapping can be controlled and doppler fluctuations can be effectively corrected in the second or later slots.

Solution to Problem

A user terminal according to one aspect of the present invention includes: a reception section that receives a downlink signal with multiple bundled slots and including a control channel, a front-loaded demodulation reference signal (DMRS), and an additional DMRS; a control section that separates the control channel, the front-loaded DMRS, and the additional DMRS from the downlink signal; and a channel estimation section that calculates a channel estimation value, using the front-loaded DMRS and the additional DMRS, in which the additional DMRS is mapped to the top slot according to channel quality, in the second or later slots, presence or absence of mapping of the additional DMRS or a mapping position of the additional DMRS is selected according to a rule related to mapping of the additional DMRS, and in the second or later slots, the control section identifies presence or absence of mapping of the additional DMRS and a mapping position of the additional DMRS according to the rule.

Advantageous Effects of Invention

According to one aspect of the present invention, in the case where time direction bundling is applied, additional DMRS mapping can be controlled and doppler fluctuations can be effectively corrected in the second or later slots.

BRIEF DESCRIPTION OF DRAWINGS

FIGS. 10A to 10D are diagrams showing examples of front-loaded DMRS mapping patterns in minislots (4 to 14 symbols)

DESCRIPTION OF EMBODIMENTS

One embodiment of the present invention will now be described in detail with reference to the accompanying drawings.

One Embodiment

Figure 1:
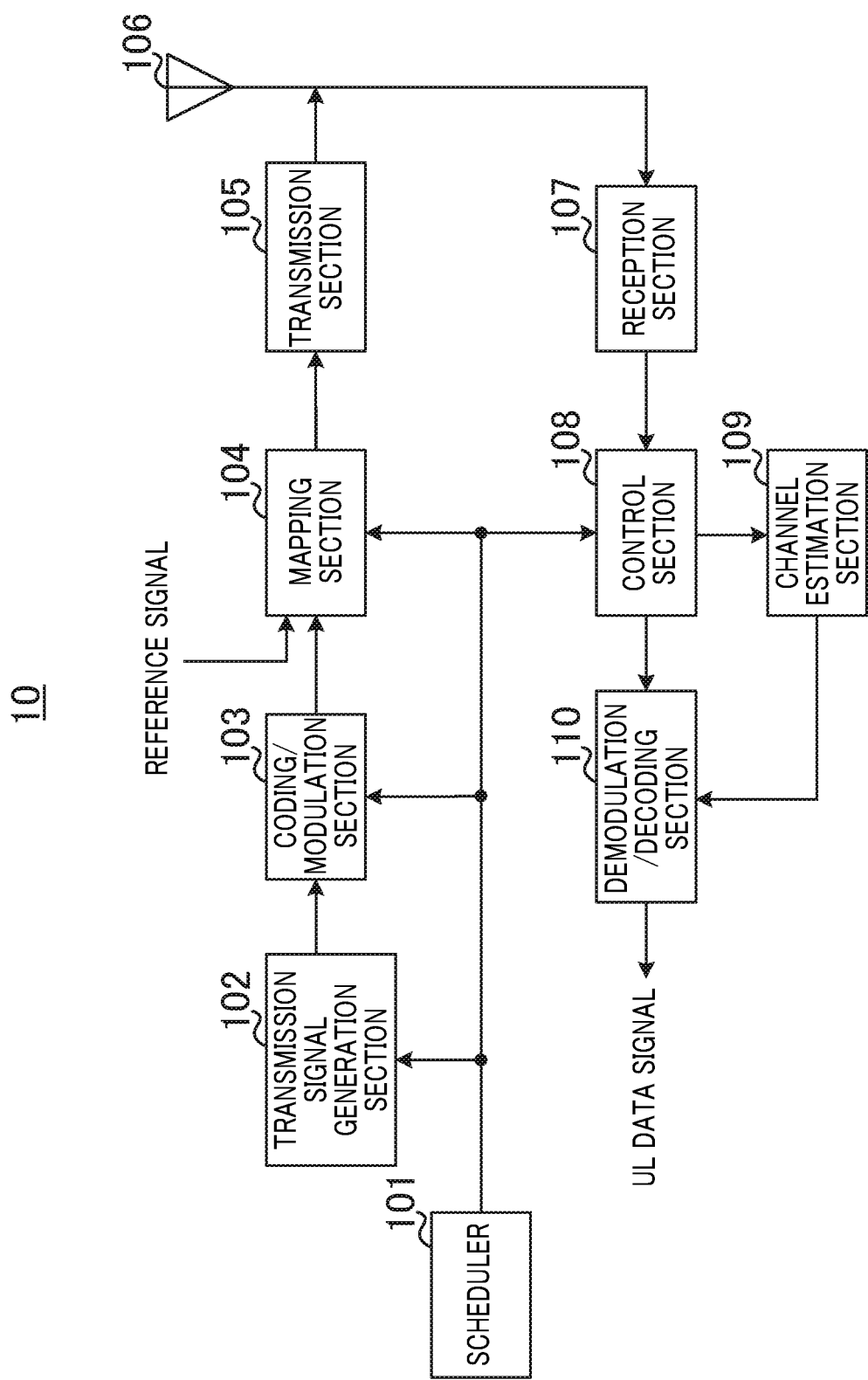
FIG. 1 is a diagram showing an example of the overall configuration of a radio base station according to one embodiment of the present invention.
Figure 2:
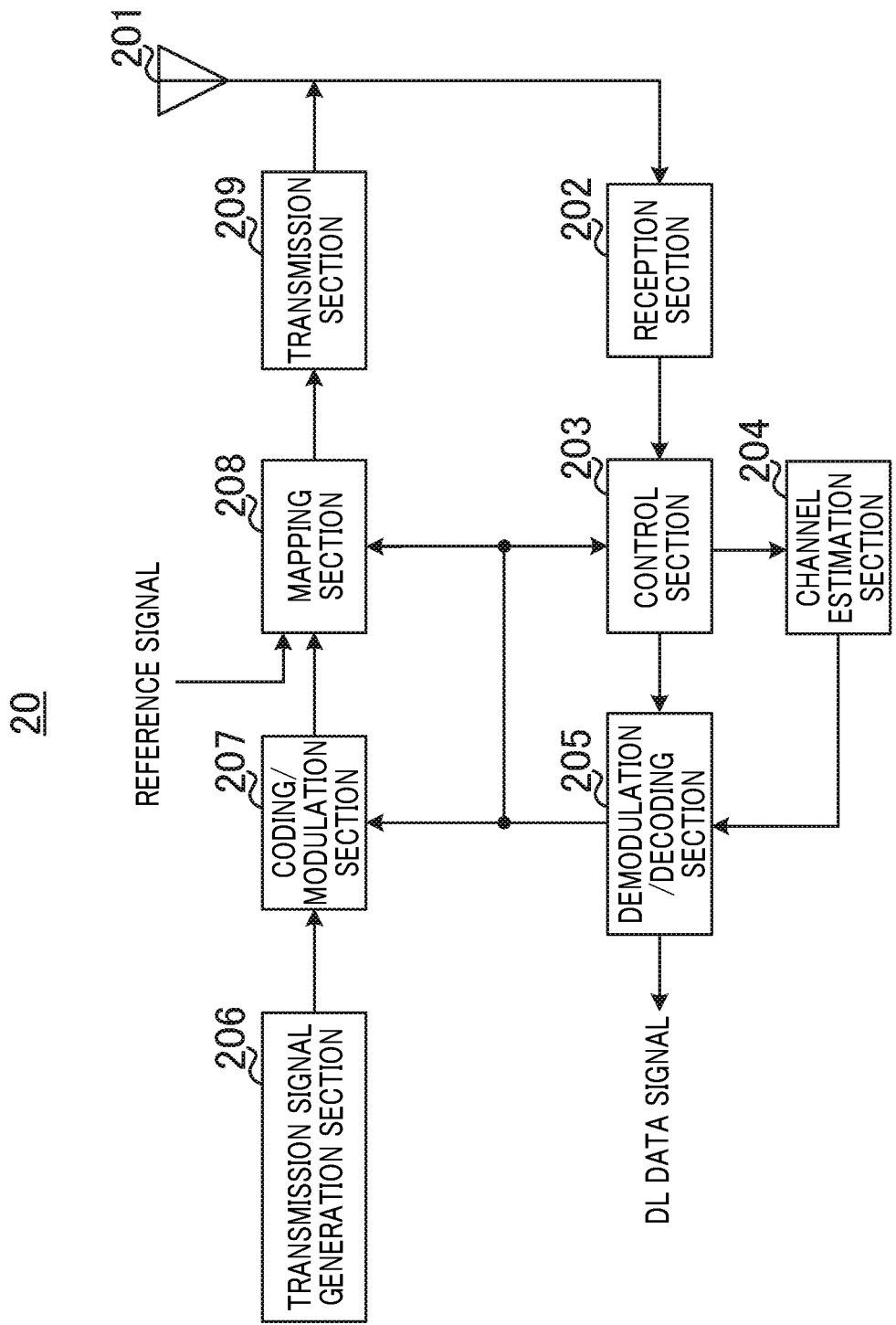
FIG. 2 is a diagram showing an example of the overall configuration of a user terminal according to one embodiment of the present invention.

A radio communication system according to this embodiment includes at least radio base station 10 shown in FIG. 1 and user terminal 20 shown in FIG. 2. User terminal 20 is connected to radio base station 10.

Radio base station 10 transmits, to user terminal 20, a DL control signal through a downlink control channel (for example, a physical downlink control channel (PDCCH)), and a DL data signal and a front-loaded DMRS through a downlink data channel (for example, a downlink shared channel: physical downlink shared channel (PDSCH)). User terminal 20 transmits, to radio base station 10, a UL control signal through an uplink control channel (for example, physical uplink control channel (PUCCH)) or uplink data channel (for example, physical uplink shared channel (PUSCH)), and a UL data signal and front-loaded DMRS through an uplink data channel (for example, an uplink shared channel: physical uplink shared channel (PUSCH)).

It should be noted that downlink channels and uplink channels through which radio base station 10 and user terminal 20 transmit and receive data are not limited the aforementioned PDCCH, PDSCH, PUCCH, PUSCH, and the like, and may be, for example, a physical broadcast channel (PBCH), a random access channel (RACH), or other channels.

DL/UL signal waveforms generated in radio base station 10 and user terminal 20 in FIGS. 1 and 2 may be signal waveforms based on orthogonal frequency division multiplexing (OFDM) modulation, signal waveforms based on single carrier-frequency division multiple access (SC-FDMA) or DFT-spread-OFDM (DFT-S-OFDM)), or other signal waveforms. In FIGS. 1 and 2, components for generating signal waveforms (for example, a DFT processing section, an IFFT processing section, a CP adding section, a CP removal section, a FFT processing section, an IDFT processing section, and the like) are omitted.

With a radio communication system according to this embodiment, transmission/reception using time direction bundling (hereinafter simply referred to as "bundling") can be achieved between radio base station 10 and user terminal 20.

Radio Base Station

FIG. 1 is a diagram showing an example of the overall configuration of radio base station 10 according to this embodiment. Radio base station 10 shown in FIG. 1 includes scheduler 101, transmission signal generation section 102, coding/modulation section 103, mapping section 104, transmission section 105, antenna 106, reception section 107, control section 108, channel estimation section 109, and demodulation/decoding section 110.

Scheduler 101 performs scheduling (for example, resource allocation and antenna port allocation) for DL signals (for example, DL data signals, DL control signals, and front-loaded DMRSs). Scheduler 101 also selects the necessity or nonnecessity of mapping of an additional DMRS to a DL signal according to the channel quality (quality degrading causes such as doppler fluctuations and propagation environments). In addition, scheduler 101 selects the presence or absence of mapping of any additional DMRS and the mapping position in the second or later slots in the case where downlink bundling is applied. Scheduler 101 performs scheduling for a downlink additional DMRS according to the results of the selection.

Scheduler 101 also performs scheduling (for example, resource allocation and antenna port allocation) for UL signals (for example, UL data signals, UL control signals, and front-loaded DMRSs). Scheduler 101 also selects the necessity or nonnecessity of mapping of an additional DMRS to a UL signal according to the channel quality. In addition, scheduler 101 selects the presence or absence of mapping of any additional DMRS and the mapping position in the second or later slots in the case where uplink bundling is applied. Scheduler 101 performs scheduling for an uplink additional DMRS according to the results of the selection.

Note that the details of additional DMRS mapping rules in the second or later slots adopted when bundling is applied will be described later.

Scheduler 101 also outputs scheduling information indicating a scheduling result to transmission signal generation section 102, mapping section 104, and control section 108.

Further, scheduler 101 configures a MCS (coding rate, modulation scheme, and the like) for the DL data signal and UL data signal according to, for example, the quality of the channel between radio base station 10 and user terminal 20, and outputs the MCS information to transmission signal generation section 102 and coding/modulation section 103. Note that the MCS is not necessarily configured by radio base station 10, and may be configured by user terminal 20. When user terminal 20 configures the MCS, radio base station 10 may receive the MCS information from user terminal 20 (not shown in the drawing).

Transmission signal generation section 102 generates transmission signals (including the DL data signal and the DL control signal). For example, the DL control signal includes downlink control information (DCI) including scheduling information (for example, resource allocation information on the DL data signal) or MCS information output from scheduler 101. Transmission signal generation section 102 outputs the generated transmission signal to coding/modulation section 103.

Coding/modulation section 103 performs coding processing and modulation processing on the transmission signal input from transmission signal generation section 102, for example, according to the MCS information input from scheduler 101. Coding/modulation section 103 outputs the modulated transmission signal to mapping section 104.

Mapping section 104 maps a transmission signal input from coding/modulation section 103 to a predetermined radio resource (DL resource) according to the scheduling information (for example, DL resource allocation and/or port allocation) input from scheduler 101. Further, mapping section 104 maps a reference signal (for example, a front-loaded DMRS or additional DMRS) to a predetermined radio resource (DL resource) according to the scheduling information. Mapping section 104 outputs the DL signal mapped to the radio resource to transmission section 105.

Transmission section 105 performs transmission processing, such as up-conversion or amplification, on the DL signal input from mapping section 104, and transmits a radio frequency signal (DL signal) from antenna 106.

Reception section 107 performs reception processing, such as amplification or down-conversion, on the radio frequency signal (UL signal) received at antenna 106, and outputs the UL signal to control section 108.

Control section 108 separates (demaps) the UL data signal and the front-loaded DMRS and additional DMRS from the UL signal input from reception section 107, according to the scheduling information (UL resource allocation and/or port allocation) input from scheduler 101. Control section 108 then outputs the UL data signal to channel estimation section 109.

Channel estimation section 109 performs channel estimation using the front-loaded DMRS and additional DMRS, and outputs the channel estimation value, which is the estimation result, to demodulation/decoding section 110.

Demodulation/decoding section 110 performs demodulation and decoding processing on the UL data signal input from control section 108 according to the channel estimation value input from channel estimation section 109. Demodulation/decoding section 110 transfers the demodulated UL data signal to an application section (not shown in the drawing). It should be noted that the application section performs, for example, processing on the physical layer or layers higher than the MAC layer.

User Terminal

FIG. 2 is a diagram showing an example of the overall configuration of user terminal 20 according to this embodiment. User terminal 20 shown in FIG. 2 includes antenna 201, reception section 202, control section 203, channel estimation section 204, demodulation/decoding section 205, transmission signal generation section 206, coding/modulation section 207, mapping section 208, and transmission section 209. User terminal 20 performs processing for receiving the radio frequency signal received at the antenna port allocated to user terminal 20.

Reception section 202 performs reception processing, such as amplification or down-conversion, on the radio frequency signal (DL signal) received at antenna 201, and outputs the DL signal to control section 203. The DL signal includes at least a DL data signal, a DL control signal, and a front-loaded DMRS, and optionally an additional DMRS.

Control section 203 separates (demaps) the DL control signal and the front-loaded DMRS and the additional DMRS from the DL signal input from reception section 202. It should be noted that control section 203 identifies the presence or absence of mapping of the additional DMRS and the mapping position in each slot, according to the rules described later. Control section 203 then outputs the DL control signal to demodulation/decoding section 205, and outputs the front-loaded DMRS and the additional DMRS to channel estimation section 204.

Control section 203 also separates (demaps) the DL data signal from the DL signal according to the scheduling information (for example, DL resource allocation information) input from demodulation/decoding section 205, and outputs the DL data signal to demodulation/decoding section 205.

Channel estimation section 204 performs channel estimation using the separated front-loaded DMRS and additional DMRS, and outputs the channel estimation value, which is the estimation result, to demodulation/decoding section 205.

Demodulation/decoding section 205 demodulates the DL control signal input from control section 203. In addition, demodulation/decoding section 205 performs decoding processing (for example, blind detection processing) on the demodulated DL control signal. Demodulation/decoding section 205 outputs the scheduling information (for example, DL/UL resource allocation and mapping configuration of the front-loaded DMRS and additional DMRS) addressed to the user terminal and obtained by decoding the DL control signal to control section 203 and mapping section 208, and outputs the MCS information related to the UL data signal to coding/modulation section 207.

Demodulation/decoding section 205 performs demodulation and decoding processing on the DL data signal input from control section 203 according to the channel estimation value input from control section 203 and the MCS information related to the DL data signal included in the DL control signal. In addition, demodulation/decoding section 205 transfers the demodulated DL data signal to the application section (not shown in the drawing). It should be noted that the application section performs, for example, processing on the physical layer or layers higher than the MAC layer.

Transmission signal generation section 206 generates a transmission signal (including a UL data signal or a UL control signal), and outputs the generated transmission signal to coding/modulation section 207.

Coding/modulation section 207 performs coding processing and modulation processing on the transmission signal input from transmission signal generation section 206, for example, according to the MCS information input from demodulation/decoding section 205. Coding/modulation section 207 outputs the modulated transmission signal to mapping section 208.

Mapping section 208 maps a transmission signal input from coding/modulation section 207 to a predetermined radio resource (UL resource) according to the scheduling information (UL resource allocation) input from demodulation/decoding section 205. Further, mapping section 208 maps a reference signal (for example, the front-loaded DMRS and the additional DMRS) to a predetermined radio resource (UL resource) according to the scheduling information (for example, the mapping configuration of the front-loaded DMRS and the additional DMRS). It should be noted that mapping section 208 selects the presence or absence of mapping of the additional DMRS and the mapping position in each slot, according to the rules described later.

Mapping section 208 outputs the UL signal mapped to the radio resource to transmission section 209.

Transmission section 209 performs transmission processing, such as up-conversion or amplification, on the UL signal (including at least the UL data signal, the front-loaded DMRS, and the additional DMRS) input from mapping section 208, and transmits a radio frequency signal (UL signal) from antenna 201.

Additional DMRS Mapping Rules

Next, concrete examples of additional DMRS mapping rules in the second or later slots adopted when bundling is applied will now be described in detail with reference to FIGS. 3 to 6. Note that an additional DMRS is mapped according to the channel quality (quality degrading causes such as doppler fluctuations and propagation environments) in the first slot.

FIGS. 3 to 6 show the mapping positions of the control channel, the front-loaded DMRS, and the additional DMRS in a resource unit (RU) (also called resource block, resource block pair, and the like) serving as a resource allocating unit.

In the RU, 168 resource elements (REs) are arranged so that 14 resource elements are aligned along the time direction and 12 resource elements are aligned along the frequency direction. One RE is a radio resource region defined by one symbol and one subcarrier. In other words, one RU consists of 14 symbols and 12 subcarriers.

In the description below, 14 symbols of an RU aligned along the time direction are called, from the left, SB 1 to SB 14. Meanwhile, 12 subcarriers of the RU aligned along the frequency direction are called, from the bottom, SC 1 to SC 12.

FIGS. 3 to 6 are based on the common assumption that radio base station 10 (user terminal 20) bundles three slots, and maps, for each slot, the control channel to the first two symbols (SB 1 and SB 2) from the top of each subcarrier, the front-loaded DMRS to the third symbol (SB 3), and, in the first slot, the additional DMRS to the ninth symbol (SB 9).

First Mapping Rule

According to the first mapping rule, in each of the second or later slots in the bundle, radio base station 10 (user terminal 20) maps the additional DMRS to the same position as the symbol position where the additional DMRS is mapped in the first slot.

Figure 3:
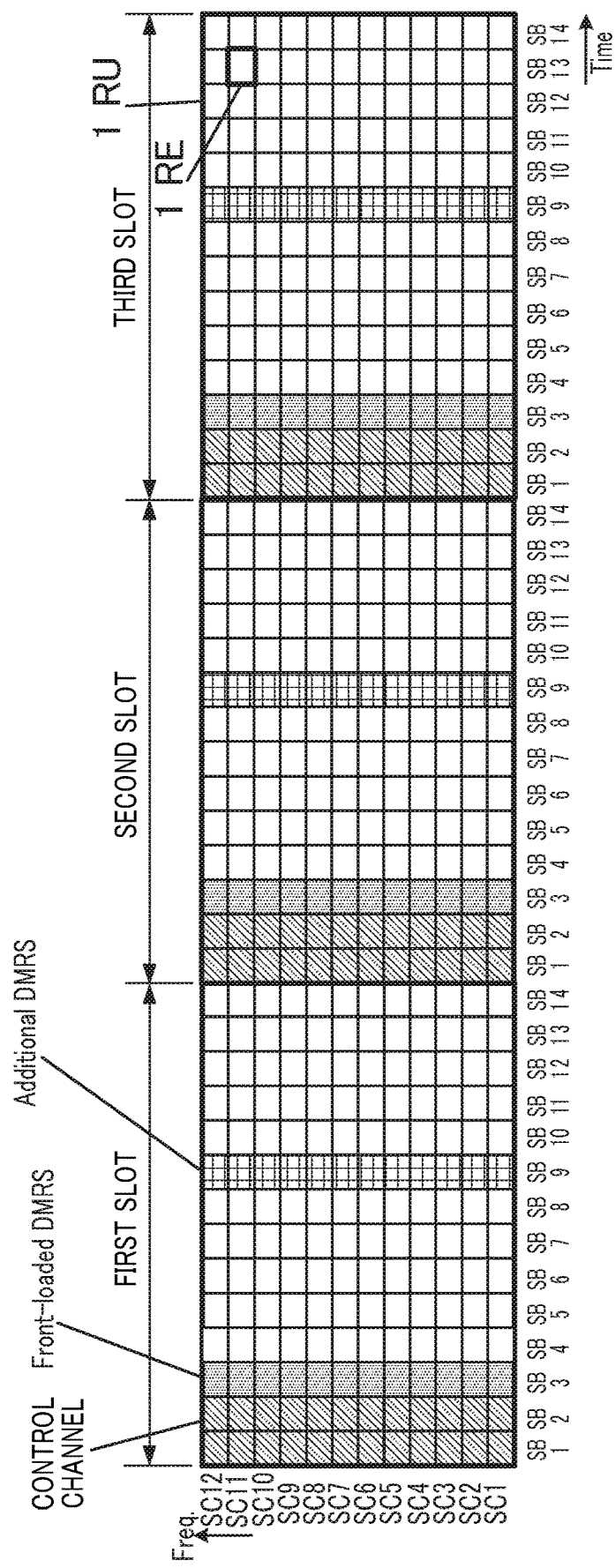
FIG. 3 is a diagram showing a concrete example of additional DMRS mapping rules (first mapping rules) of one embodiment of the present invention.

For example, as shown in FIG. 3, in the second and third slots, radio base station 10 (user terminal 20) maps the additional DMRS to the ninth symbol (SB 9) as in the first slot.

Hence, the necessity of new signaling for notifying the mapping position of the additional DMRS in the second or later slots is eliminated, thereby reducing the overhead.

In this case, user terminal 20 (radio base station 10) serving as a receiver performs channel estimation using the front-loaded DMRS and the additional DMRS mapped to each slot.

Note that, according to the first mapping rule, when the additional DMRS is not mapped in the first slot, the additional DMRS is not mapped in the second or later slots.

Further, according to the first mapping rule, when the additional DMRS in the second slot collides with any other reference signals (for example, CSI-RS) if it is mapped to the same position as in the first slot, its insertion position may be shifted backward or forward.

Second Mapping Rule

According to the second mapping rule, in each of the second or later slots in the bundle, radio base station 10 (user terminal 20) always maps the additional DMRS to a predetermined (predefined) position or a position configured by radio resource control (RRC).

Figure 4:
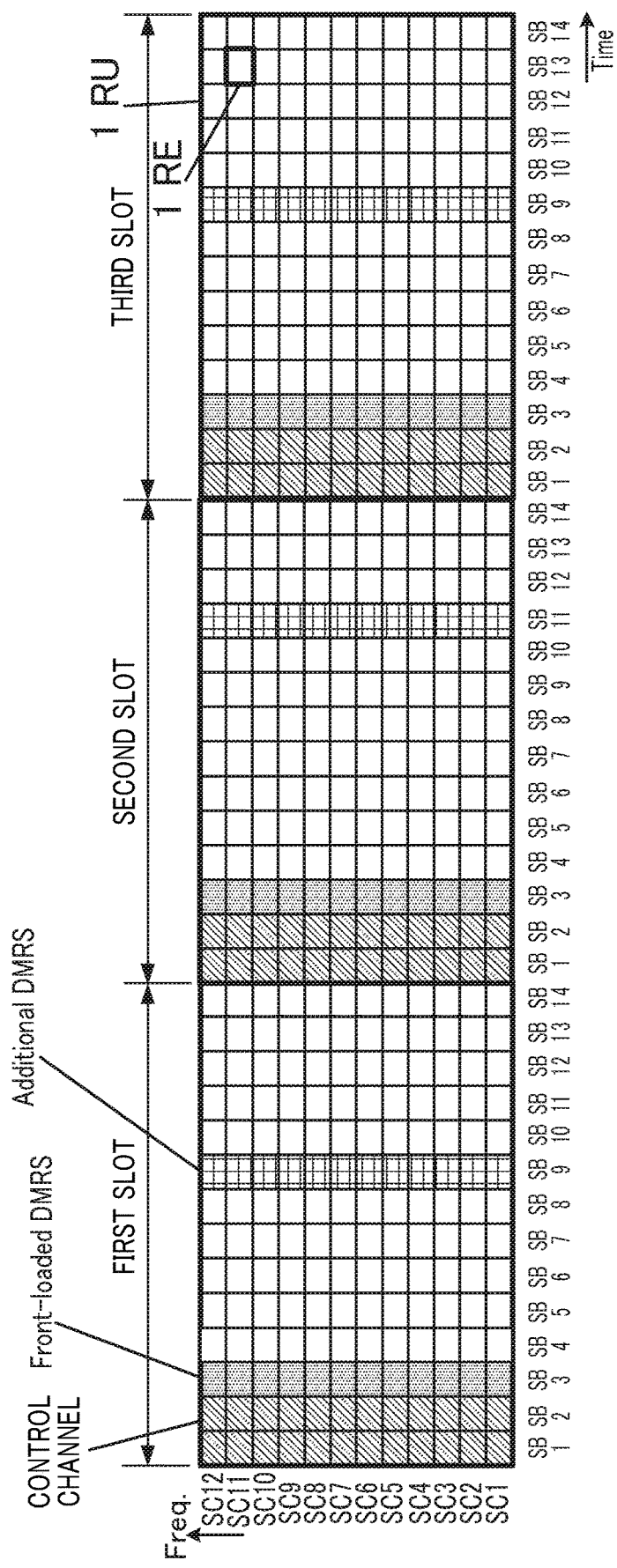
FIG. 4 is a diagram showing a concrete example of additional DMRS mapping rules (second mapping rules) of one embodiment of the present invention.

For example, the eleventh symbol (SB 11) is configured in advance as a mapping position of the additional DMRS in the second slot, and the ninth symbol (SB 9) is configured in advance as a mapping position of the additional DMRS in the third slot. In this case, as shown in FIG. 4, according to the above-described configuration, radio base station 10 (user terminal 20) maps the additional DMRS to the eleventh symbol (SB 11) in the second slot and the ninth symbol (SB 9) in the third slot.

Hence, the necessity of new signaling for notifying the mapping position of the additional DMRS in the second or later slots is eliminated, thereby reducing the overhead.

In this case, user terminal 20 (radio base station 10) serving as a receiver performs channel estimation using the front-loaded DMRS and the additional DMRS mapped to each slot.

Note that, according to the second mapping rule, mapping positions of the additional DMRS configured in advance may differ depending on each slot or may be common to all slots.

Further, according to the second mapping rule, in the case where the additional DMRS collides with any other reference signals (for example, CSI-RS) when mapped in the second slot, its insertion position may be shifted backward or forward.

Third Mapping Rule

According to the third mapping rule, in each of the second or later slots in the bundle, radio base station 10 (user terminal 20) does not map the additional DMRS.

Figure 5:
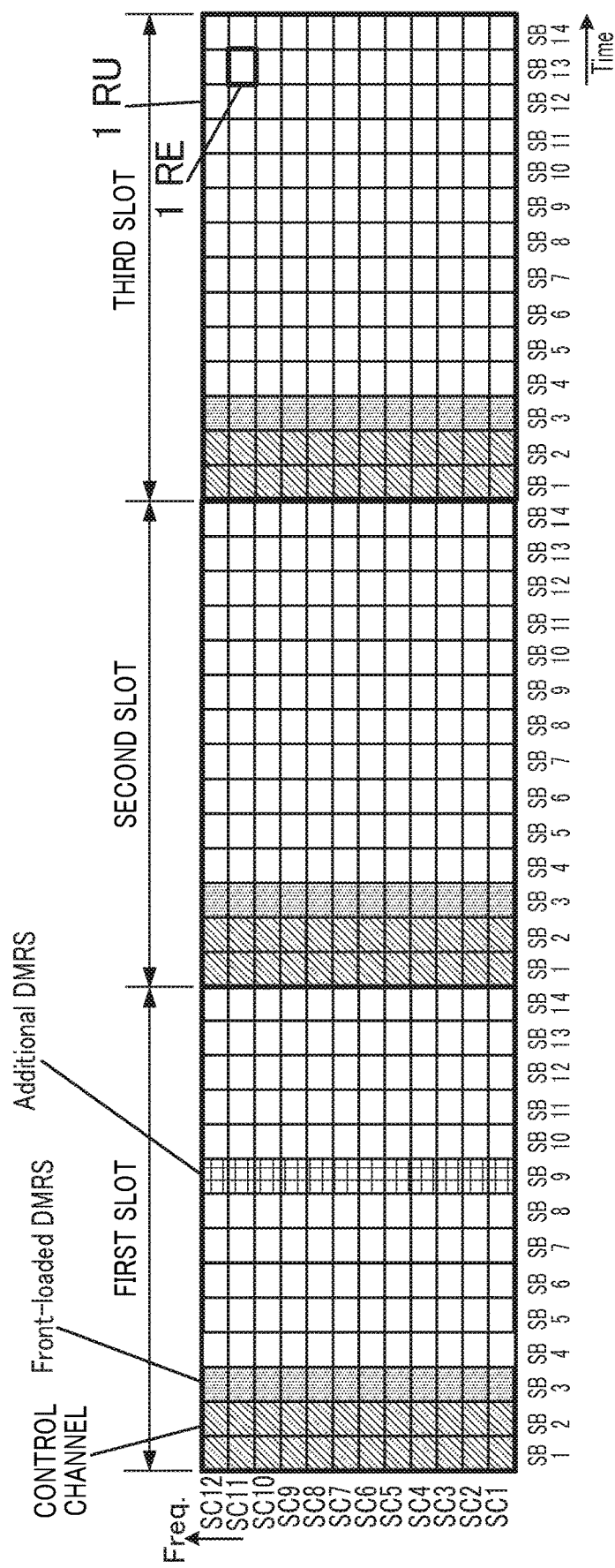
FIG. 5 is a diagram showing a concrete example of additional DMRS mapping rules (third mapping rules) of one embodiment of the present invention.

For example, as shown in FIG. 5, radio base station 10 (user terminal 20) does not map the additional DMRS in the second and third slots.

Hence, the necessity of new signaling for notifying the mapping position of the additional DMRS in the second or later slots is eliminated, thereby reducing the overhead.

In this case, user terminal 20 (radio base station 10) serving as a receiver performs channel estimation using the front-loaded DMRS mapped to each slot and the additional DMRS mapped to the first slot.

Fourth Mapping Rule

According to the fourth mapping rule, in each of the second or later slots in the bundle, radio base station 10 determines the presence or absence of mapping of the additional DMRS and the mapping position as appropriate. For example, as the doppler fluctuations increase, the number of slots to which the additional DMRS is mapped is increased.

According to the fourth mapping rule, radio base station 10 notifies user terminal 20 of the presence or absence of mapping of the additional DMRS and the mapping position through signaling. User terminal 20 performs separation and mapping of the additional DMRS according to the notification through the signaling. With the fourth mapping rule, additional DMRS mapping can be performed with flexibility according to the environments of propagation to/from user terminal 20, the travel speed, processing ability, and the like of user terminal 20.

Figure 6:
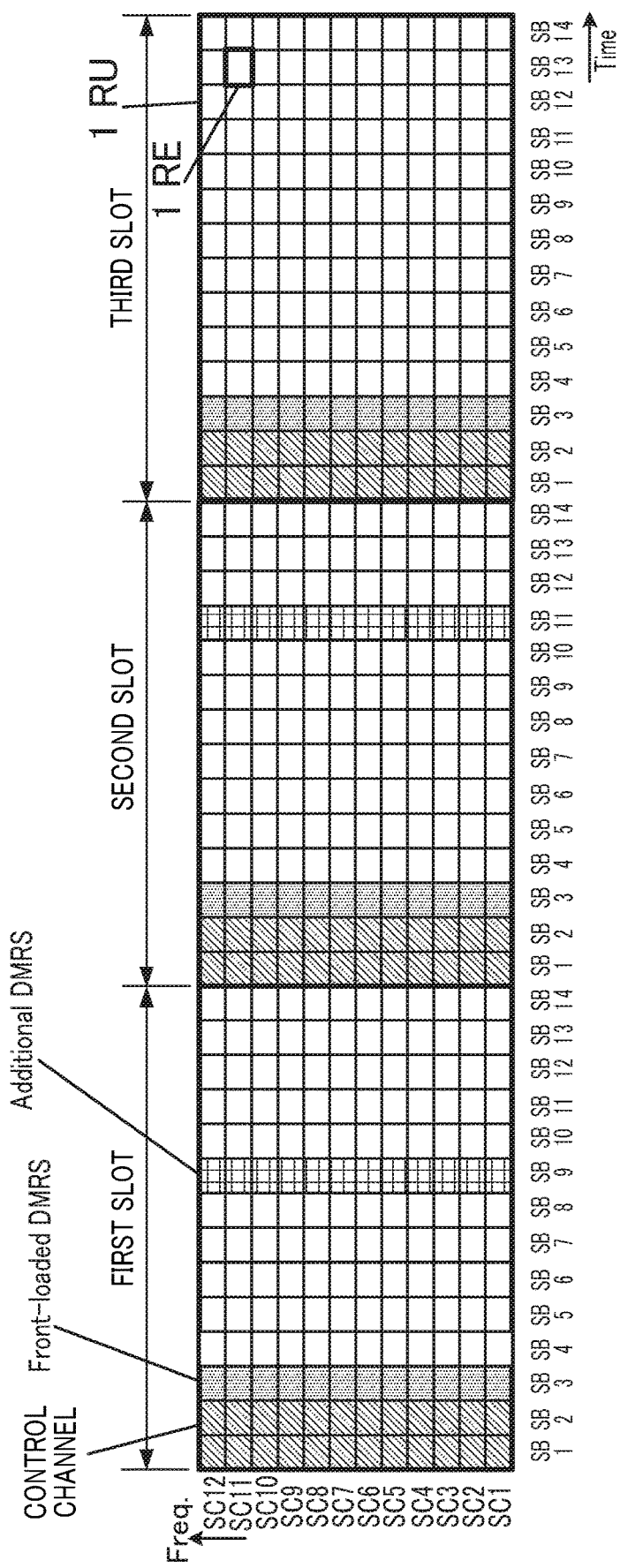
FIG. 6 is a diagram showing a concrete example of additional DMRS mapping rules (fourth mapping rules) of one embodiment of the present invention.

For example, as shown in FIG. 6, radio base station 10 makes determination so that the additional DMRS is mapped to the eleventh symbol (SB 11) in the second slot, and the additional DMRS is not mapped to the third slot, and notifies user terminal 20 of this through signaling.

In this case, user terminal 20 (radio base station 10) serving as a receiver performs channel estimation using the front-loaded DMRS mapped to each slot and the additional DMRS mapped to the first and second slots.

Note that, according to the fourth mapping rule, mapping positions of the additional DMRS may differ depending on each slot or may be common to all slots.

In addition, according to the fourth mapping rule, radio base station 10 may notify signaling for every slot or may collectively notify for the second or later slots commonly configured. Moreover, radio base station 10 may notify signaling for the second or later slots in the same manner as for the first slot, or in a manner different from for the first slot. For example, for the first slot, notification may be dynamically done through DCI, while for the second or later slots, notification may be statically done through RRC.

Regarding the above-described signaling, signaling may be unique to each user terminal 20 or common to allocation RBs, sub-bands, resource block groups (RBGs), component carriers (CCs), cells, or carrier frequencies. The above-described signaling may be RRC signaling, MAC signaling, or PHYY signaling. In addition, the above-described signaling may be notified periodically or dynamically (nonperiodically).

Effects of the Embodiment

As described above, in this embodiment, in the case where time direction bundling is applied, radio base station 10 and user terminal 20 control the presence or absence of mapping of the additional DMRS and the mapping position in each of the second or later slots, according to a rule related to additional DMRS mapping. Hence, in the case where bundling is applied, doppler fluctuations can be effectively corrected.

In addition, in this embodiment, the mapping position of the additional DMRS in each of the second or later slots is associated with the mapping position of the additional DMRS in the first slot or configured in advance. Hence, the necessity of new signaling is eliminated, thereby reducing the overhead.

Further, in this embodiment, the presence or absence of mapping of the additional DMRS and the mapping position in each of the second or later slots are determined as appropriate and notified through signaling. Hence, additional DMRS mapping can be performed with flexibility according to the environments of propagation and the like.

Note that in this embodiment, the symbol position of the control channel is not limited to those shown in FIGS. 3 to 6, and may be, for example, mapped only to the symbols (RE) of a part of the subcarriers.

In addition, in this embodiment, additional DMRS mapping rules to be applied may be notified from each radio base station 10 to user terminal 20 through signaling or may be described in advance in the specification. Besides, the rules described in the specification may be changed through signaling.

In this embodiment, within the slots in a bundle, multiple additional DMRS mapping rules may be used in combination.

Example Application of Minislots

Although mapping patterns in an RU in which 168 REs are arranged so that 14 REs are aligned along the time direction and 12 REs are aligned along the frequency direction have been described in the above-described example, this is not necessarily the case in the present invention. For example, the present invention is also applicable to front-loaded DMRS mapping in a resource allocating unit which has 1 to 14 symbols and is called "minislot".

Example Application 1

Figure 7:
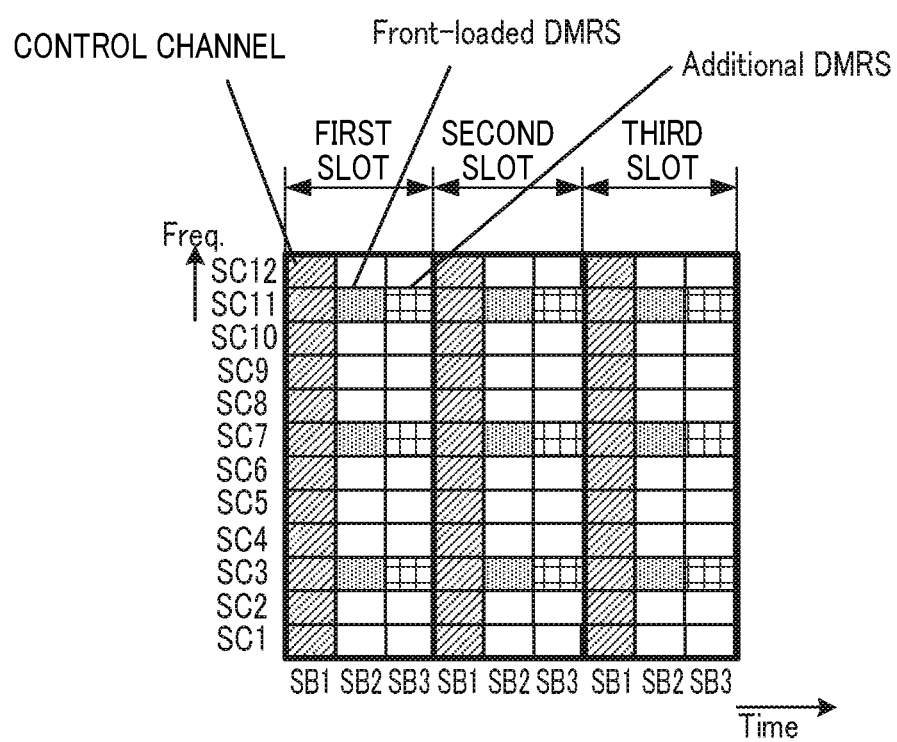
FIG. 7 is a diagram showing a concrete example of the case where additional DMRS mapping rules (first mapping rules) of one embodiment of the present invention are applied to minislots.

FIG. 7 shows an example of the case where the above-described first mapping rule is applied to 3-symbol minislots. In the example shown in FIG. 7, radio base station 10 (user terminal 20) maps, for each slot, the control channel to the top symbol (SB 1), the front-loaded DMRS to the second symbol (SB 2), and, in the first slot, the additional DMRS to the third symbol (SB 3).

In this case, radio base station 10 (user terminal 20) maps the additional DMRS to the third symbol (SB 3) in the second and third slots.

User terminal 20 (radio base station 10) serving as a receiver performs channel estimation using the front-loaded DMRS and the additional DMRS mapped to each slot.

Example Application 2

Figure 8:
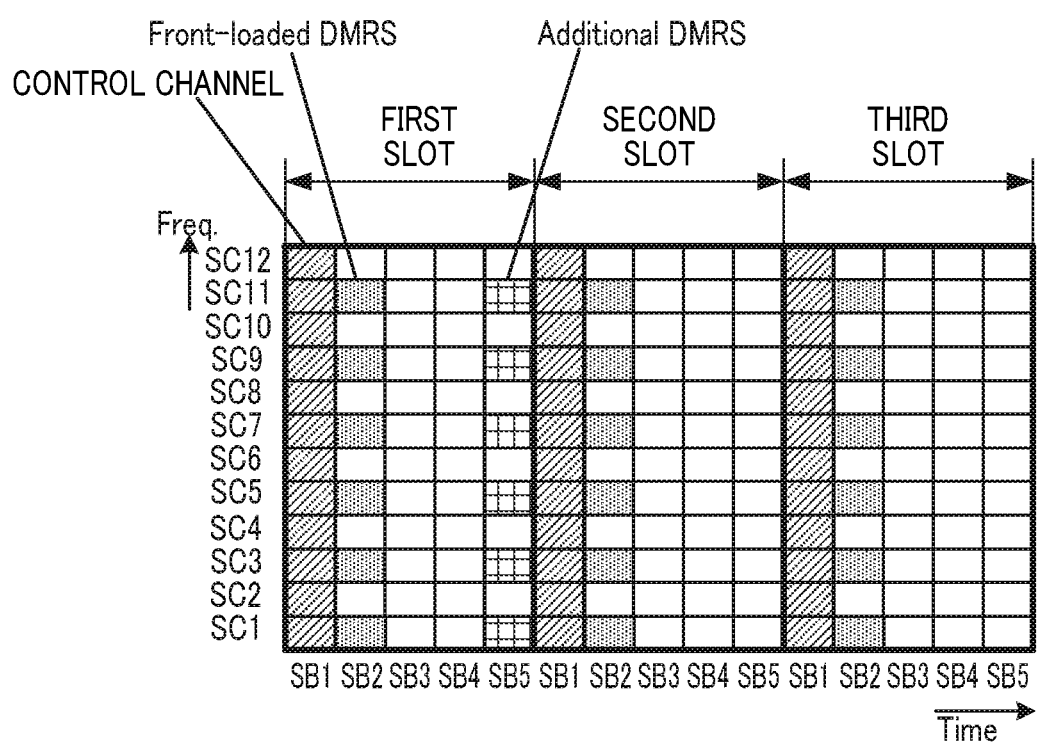
FIG. 8 is a diagram showing a concrete example of the case where additional DMRS mapping rules (third mapping rules) of one embodiment of the present invention are applied to minislots.

FIG. 8 shows an example of the case where the above-described third mapping rule is applied to 5-symbol minislots. In the example shown in FIG. 8, radio base station 10 (user terminal 20) maps, for each slot, the control channel to the top symbol (SB 1), the front-loaded DMRS to the second symbol (SB 2), and, in the first slot, the additional DMRS to the fifth symbol (SB 5).

In this case, radio base station 10 (user terminal 20) does not map the additional DMRS to the second and third slots.

User terminal 20 (radio base station 10) serving as a receiver performs channel estimation using the front-loaded DMRS mapped to each slot and the additional DMRS in the top slot.

Note that, in this embodiment, the symbol positions in the minislots are not limited to those shown in FIGS. 7 and 8. Further, when bundling is applied, minislots with different numbers of symbols may coexist. In this case, even when the above-described first mapping rule is applied, slots with a number of symbols different from that in the first slot may adopt other mapping rules.

Examples of Additional DMRS Mapping Patterns in Minislots

Examples of additional DMRS mapping patterns in minislots will now be described with reference to FIGS. 9A to 9F and FIG. 10A to 10D.

Three-Symbol Minislot

FIGS. 9A to 9F show examples of additional DMRS mapping patterns in 3-symbol minislots. It should be noted that FIGS. 9A to 9F all show the case where the control channel is mapped to the top symbols of all subcarriers.

Figure 9A:
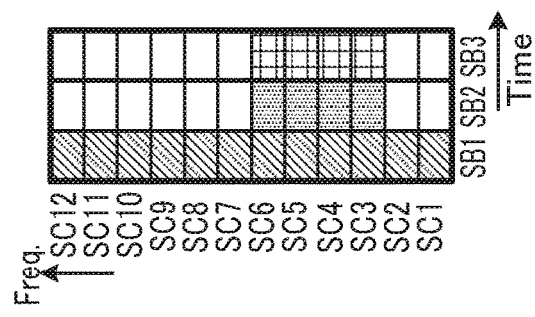
FIGS. 9A to 9F are diagrams showing examples of front-loaded DMRS mapping patterns in minislots (three symbols)
Figure 9C:
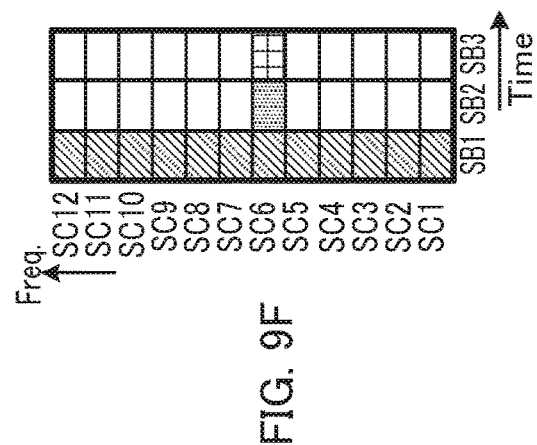
Figure 9B:
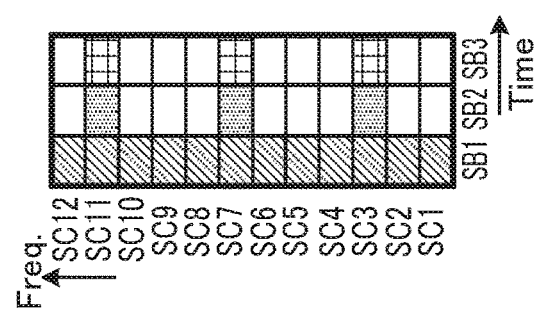
Figure 9E:
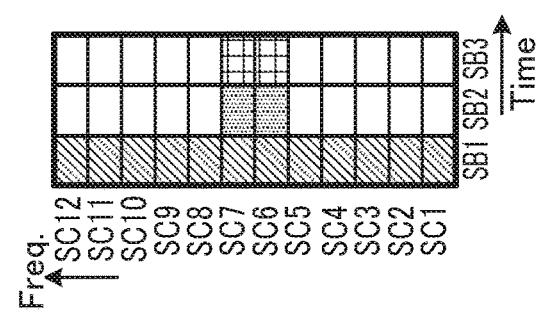
Figure 9D:
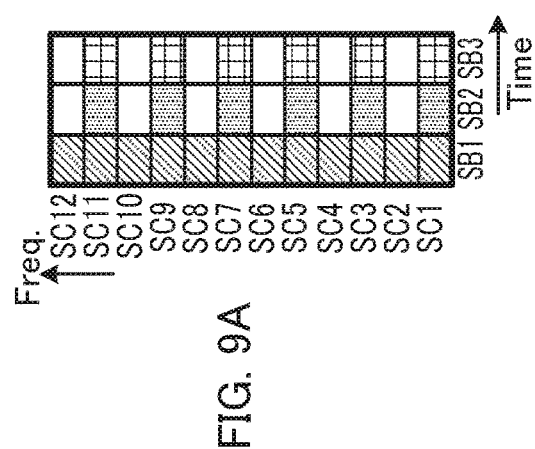
Figure 9F:
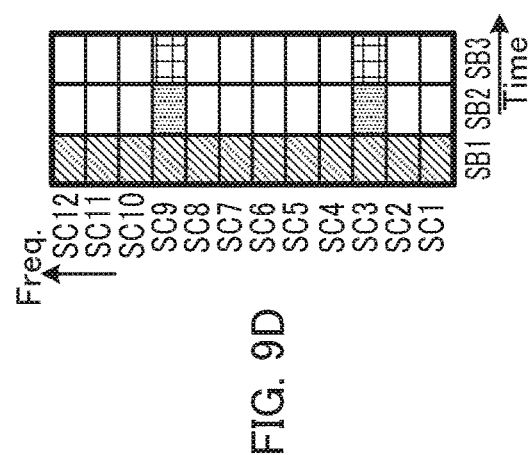

FIG. 9A shows the case where the front-loaded DMRS is mapped to the first, third, fifth, seventh, ninth, and eleventh subcarriers in the second symbol (SB 2), and the additional DMRS is mapped to the first, third, fifth, seventh, ninth, and eleventh subcarriers in the third symbol (SB 3). FIG. 9B shows the case where the front-loaded DMRS is mapped to the third, seventh, and eleventh subcarriers in the second symbol (SB 2), and the additional DMRS is mapped to the third, seventh, and eleventh subcarriers in the third symbol (SB 3). FIG. 9C shows the case where the front-loaded DMRS is mapped to the third, fourth, fifth, and sixth subcarriers in the second symbol (SB 2), and the additional DMRS is mapped to the third, fourth, fifth, and sixth subcarriers in the third symbol (SB 3). FIG. 9D shows the case where the front-loaded DMRS is mapped to the third and ninth subcarriers in the second symbol (SB 2), and the additional DMRS is mapped to the third and ninth subcarriers in the third symbol (SB 3). FIG. 9E shows the case where the front-loaded DMRS is mapped to the sixth and seventh subcarriers in the second symbol (SB 2), and the additional DMRS is mapped to the sixth and seventh subcarriers in the third symbol (SB 3). FIG. 9F shows the case where the front-loaded DMRS is mapped to the sixth subcarrier in the second symbol (SB 2), and the additional DMRS is mapped to the sixth subcarrier in the third symbol (SB 3).

4 to 14-Symbol Minislots

FIGS. 10A to 10D show examples of additional DMRS mapping patterns in 4 to 14-symbol minislots. It should be noted that FIGS. 10A to 10D all show the case where the control channel is mapped to the top symbols of all subcarriers.

FIG. 10A shows the case where the front-loaded DMRS is mapped to the first, third, fifth, seventh, ninth, and eleventh subcarriers in the second symbol (SB 2), and the additional DMRS is mapped to the first, third, fifth, seventh, ninth, and eleventh subcarriers in the i-th (i is an integer in the range from 3 to 13) symbol (SBi). FIG. 10B shows the case where the front-loaded DMRS is mapped to the first, third, fifth, seventh, ninth, and eleventh subcarriers in the second and third symbols (SB 2 and SB 3), and the additional DMRS is mapped to the first, third, fifth, seventh, ninth, and eleventh subcarriers in the j-th (j is an integer in the range from 4 to 12) and (j+1)-th symbols (SBj and SB(j+1)). FIG. 10C shows the case where the front-loaded DMRS is mapped to the first, second, seventh, and eighth subcarriers in the second symbol (SB 2), and the additional DMRS is mapped to the first, second, seventh, and eighth subcarriers in the i-th symbol (SBi). FIG. 10D shows the case where the front-loaded DMRS is mapped to the first, second, seventh, and eighth subcarriers in the second and third symbols (SB 2 and SB 3), and the additional DMRS is mapped to the first, second, seventh, and eighth subcarriers in the j-th and (j+1)-th symbols (SBj and SB(j+1)).

Others

Note that, in this embodiment, any one of the above-described first to fourth additional DMRS mapping rules may be commonly applied to all user terminals 20 located in the same cell or may be selected as appropriate for each user terminal 20. In addition, a common mapping rule may be applied to all radio base stations 10, or a mapping rule may be selected as appropriate for each radio base station 10.

In addition, in this embodiment, each radio base station 10 may select any of the above-described first to fourth additional DMRS mapping rules depending on the data channel. For example, each radio base station 10 may select a predetermined mapping rule when mapping the additional DMRS for a sub-frame including a particular data channel. Examples of the particular data channel include data channels including system information, data channels including a signaling radio bearer (SRB), data channels including a hand over command, data channels scheduled using downlink control information (DCI) transmitted through a common search space, and data channels including an activation command.

In addition, in this embodiment, radio base station 10 may map the additional DMRS for each layer so that they are orthogonal to each other between layers (layer multiplexing), or may map it commonly to layers (one layer transmission). In addition, radio base station 10 may configure an antenna port number that is the same as any additional DMRS port number, or may configure a different port number.

In addition, in this embodiment, the additional DMRS may be mapped every m (m is more than one) slots.

It should be noted that the above-described front-loaded DMRS and additional DMRS may be called demodulation RS. The front-loaded DMRS and additional DMRS may be called reference signal.

The embodiments of the present invention have been described above.

Hardware Configuration

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 11:
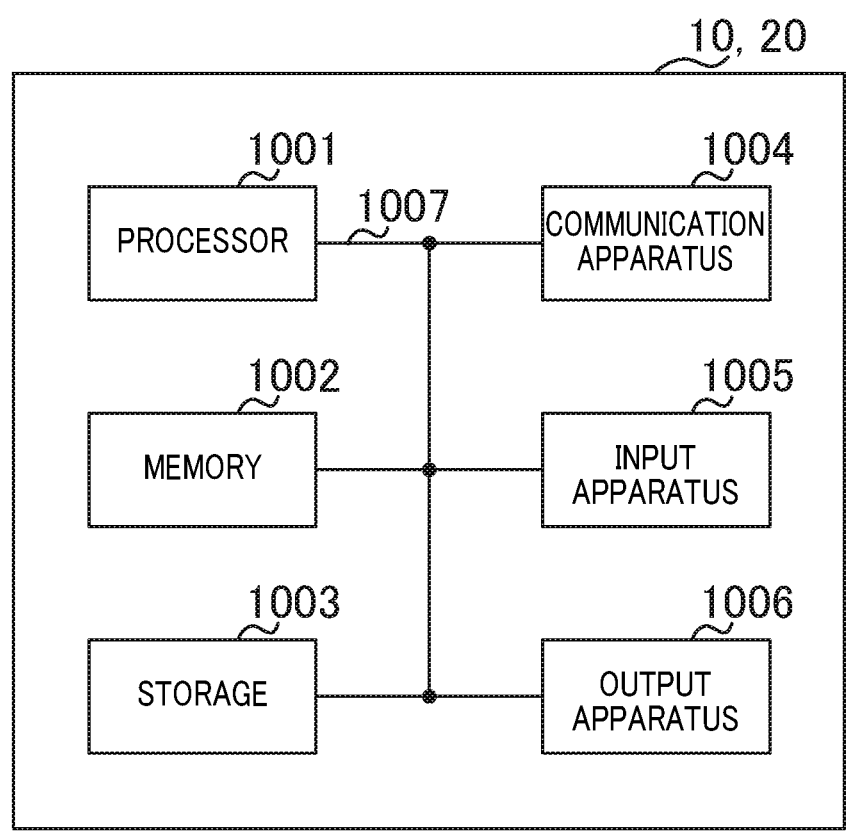
FIG. 11 is a diagram showing one example of the hardware configuration of a radio base station and a user terminal according to one embodiment of the present invention.

For example, the radio base station, the user terminal, and the like according to an embodiment of the present invention may function as a computer that executes processing of a radio communication method of the present invention. FIG. 11 illustrates an example of a hardware configuration of the radio base station and the user terminal according to an embodiment of the present invention. Radio base station 10 and user terminal 20 as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base station 10 and of user terminal 20 may include one apparatus or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10 and user terminal 20 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, scheduler 101, control sections 108 and 203, transmission signal generation sections 102 and 206, coding/modulation sections 103 and 207, mapping sections 104 and 208, channel estimation sections 109 and 204, demodulation/decoding sections 110 and 205, and the like, which are described above, may be implemented via processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, scheduler 101 of radio base station 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmission sections 105 and 209, antennas 106 and 201, reception sections 107 and 202, and the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

Notification and Signaling of Information

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

Adaptive System

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

Processing Procedure and the Like

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

Operation of Base Station

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

Direction of Input and Output

The information, the signals, and the like can be output from a higher layer (or a lower layer) to a lower layer (or a higher layer). The information, the signals, and the like may be input and output through a plurality of network nodes.

Handling of Input and Output Information and the Like

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

Determination Method

The determination may be made based on a value expressed by one bit (0 or 1), based on a Boolean value (true or false), or based on comparison with a numerical value (for example, comparison with a predetermined value).

Software

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

Information and Signals

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

"System" and "Network"

The twins "system" and "network" used in the present specification can be interchangeably used.

Names of Parameters and Channels

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

Base Station

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "gNB," "cell," and "sector" can be interchangeably used in the present specification. The base station may be called a fixed station, a NodeB, an eNodeB (eNB), a gNodeB, an access point, a femto cell, a small cell, or the like.

Terminal

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

Meaning and Interpretation of Terms

As used herein, the term "determining" may encompass a wide variety of actions. For example, "determining" may be regarded as judging, calculating, computing, processing, deriving, investigating, looking up (for example, looking up in a table, a database or another data structure), ascertaining and the like. Also, "determining" may be regarded as receiving (for example, receiving information), transmitting (for example, transmitting information), inputting, outputting, accessing (for example, accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard.

In addition, the front-loaded DMRS may also be called with a corresponding different name.

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, the minislot, and the symbol indicate time units in transmitting signals. The radio frame, the subframe, the slot, the minislot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe, a plurality of continuous subframes, one slot, or one minislot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one minislot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the number of minislots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

Variations and the Like of Aspects

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

INDUSTRIAL APPLICABILITY

An aspect of the present invention is useful for a mobile communication system.

REFERENCE SIGNS LIST

10 Radio base station
20 User terminal
101 Scheduler
102, 206 Transmission signal generation section
103, 207 Coding/modulation section
104, 208 Mapping section
105, 209 Transmission section
106, 201 Antenna
107, 202 Reception section
108, 203 Control section
109, 204 Channel estimation section
110, 205 Demodulation/decoding section

The invention claimed is:
1. A terminal comprising:
a processor that maps a front-loaded demodulation reference signal (DMRS) and an additional DMRS to a physical uplink shared channel (PUSCH); and
a transmitter that transmits the PUSCH being with aggregated multiple slots along a time direction when the terminal is configured with aggregation,
wherein, the processor maps the front-loaded DMRS to the same symbol position in a first half of each of the aggregated multiple slots; and
when the additional DMRS is mapped to a top slot of the aggregated multiple slots, the processor maps the additional DMRS in each of a second and later slots of the aggregated multiple slots to the same symbol position as in the top slot.
2. The terminal according to claim 1, wherein:
the processor maps the additional DMRS to a symbol behind the front-loaded DMRS in the each of the aggregated multiple slots.
3. A terminal comprising:
a receiver that receives a physical downlink shared channel (PDSCH) including a front-loaded demodulation reference signal (DMRS) and an additional DMRS, the PDSCH being with aggregated multiple slots along a time direction when the terminal is configured with aggregation; and
a processor that performs reception processing by referring to the front-loaded DMRS and the additional DMRS, wherein, the front-loaded DMRS is mapped to the same symbol position in a first half of each of the aggregated multiple slots; and when the additional DMRS is mapped to a top slot of the aggregated multiple slots, the additional DMRS is mapped in each of a second and later slots of the aggregated multiple slots to the same symbol position as in the top slot.

4. The terminal according to claim 3, wherein:

the additional DMRS is mapped to a symbol behind the front-loaded DMRS in the each of the aggregated multiple slots.

5. A base station comprising:

a receiver that receives a physical uplink shared channel (PUSCH) including a front-loaded demodulation reference signal (DMRS) and an additional DMRS, the PUSCH being with aggregated multiple slots along a time direction when the terminal is configured with aggregation; and a processor that performs reception processing by referring to the front-loaded DMRS and the additional DMRS, wherein, the front-loaded DMRS is mapped to the same symbol position in a first half of each of the aggregated multiple slots; and when the additional DMRS is mapped to a top slot of the aggregated multiple slots, the additional DMRS is mapped in each of a second and later slots of the aggregated multiple slots to the same symbol position as in the top slot.

6. The base station according to claim 5, wherein:

the additional DMRS is mapped to a symbol behind the front-loaded DMRS in the each of the aggregated multiple slots.

* * * * *